(12) United States Patent
Maenle et al.

(10) Patent No.: US 6,257,343 B1
(45) Date of Patent: Jul. 10, 2001

(54) COMPACT FOLDING ROW MARKER

(75) Inventors: William C. Maenle, Ottoville; David R. Smith; Michael J. Hilvers, both of Fort Jennings, all of OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 09/578,506

(22) Filed: May 26, 2000

(51) Int. Cl.$^7$ ................................................. A01B 69/02
(52) U.S. Cl. ............................................................ 172/126
(58) Field of Search .................................. 172/126, 127, 172/128, 130, 131, 132

(56) References Cited

U.S. PATENT DOCUMENTS

| | | | |
|---|---|---|---|
| 4,449,590 | * 5/1984 | Williamson | 172/126 |
| 4,526,265 | 7/1985 | Enns | 198/318 |
| 4,986,367 | 1/1991 | Kinzenbaw | 172/126 |
| 5,027,525 | 7/1991 | Haukaas | 172/126 X |
| 5,379,847 | 1/1995 | Snyder | 172/126 |
| 5,408,756 | * 4/1995 | Wahls | 172/126 X |
| 5,425,427 | 6/1995 | Haugen | 172/126 |
| 5,542,190 | * 8/1996 | Wahls | 172/126 X |
| 5,573,070 | 11/1996 | Meek et al. | 172/126 X |
| 5,785,128 | 7/1998 | Redekop | 172/126 |
| 5,839,516 | 11/1998 | Arnold et al. | 172/456 |
| 5,992,534 | 11/1999 | Callies et al. | 172/126 |

* cited by examiner

Primary Examiner—Christopher J. Novosad
(74) Attorney, Agent, or Firm—Rothwell, Figg, Ernst & Manbeck

(57) ABSTRACT

A folding row marker assembly for use with an agricultural implement has an inner link assembly that includes both a mounting that attaches to the agricultural implement and one or more inner link members. The row marker further includes first arm members that hingedly connect to both the first link assembly and an outer link assembly. In one embodiment, the folding row marker assembly has two sections, including an outer arm member that hingedly connects to the outer link assembly and connects to a marker. In an alternative three-section embodiment, the outer link assembly includes a middle section having a middle link assembly that connects to the inner arm members, an outboard link assembly that connects to the outer arm member, and middle arm members that connect the middle link assembly to the outboard link assembly. In the row marker, a radial motion of the inner arm members around the inner link assembly, caused by an actuating mechanism such as a hydraulic cylinder that is connected to one of the inner link member and one of the inner arm members, results in the in a controlled radial motion of the outer arm member around the outer link assembly. As a result, the folding row marker assembly moves between a folded storage position and an extended, generally horizontal use position in which the marker engages the ground.

11 Claims, 15 Drawing Sheets

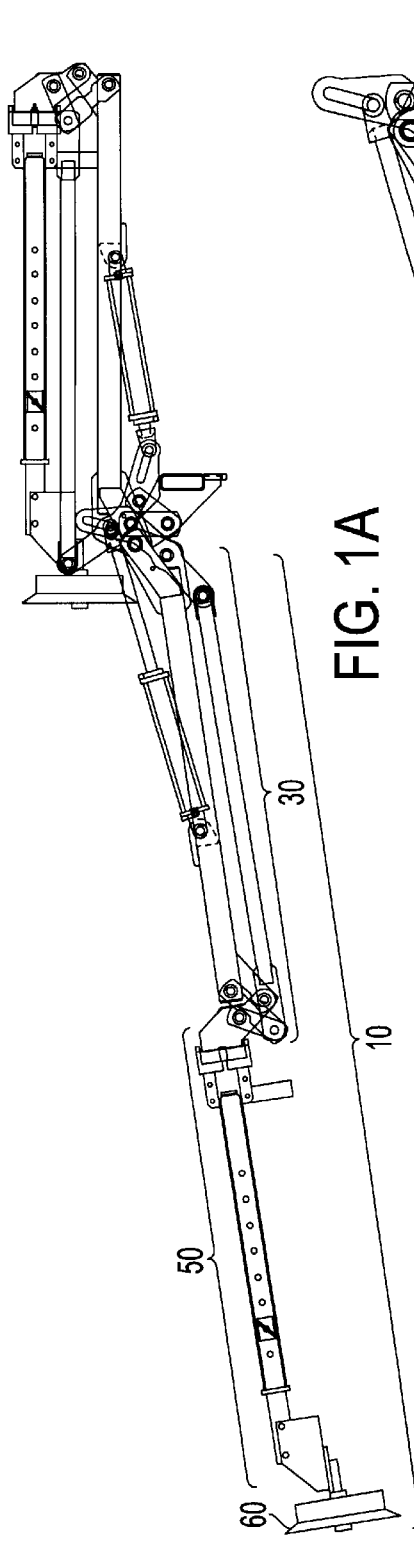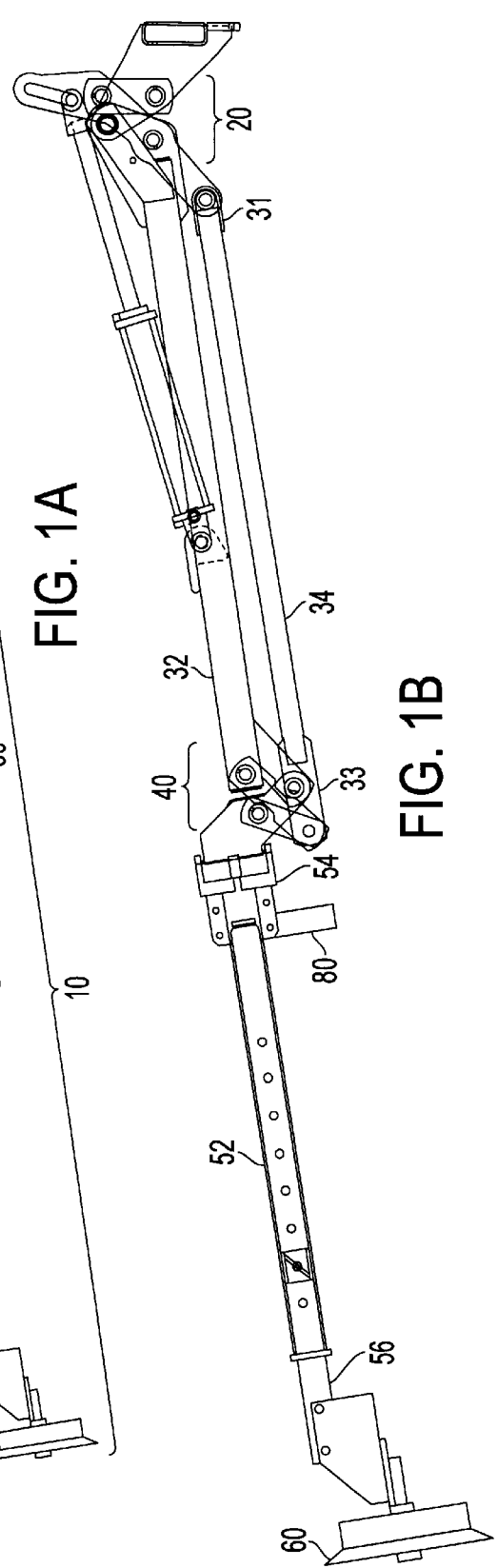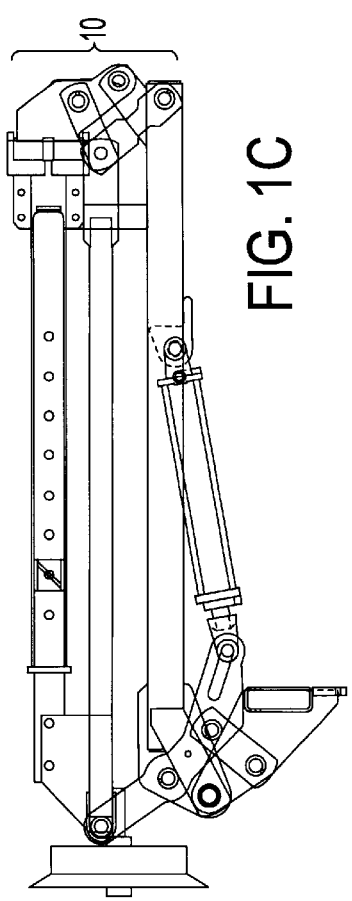

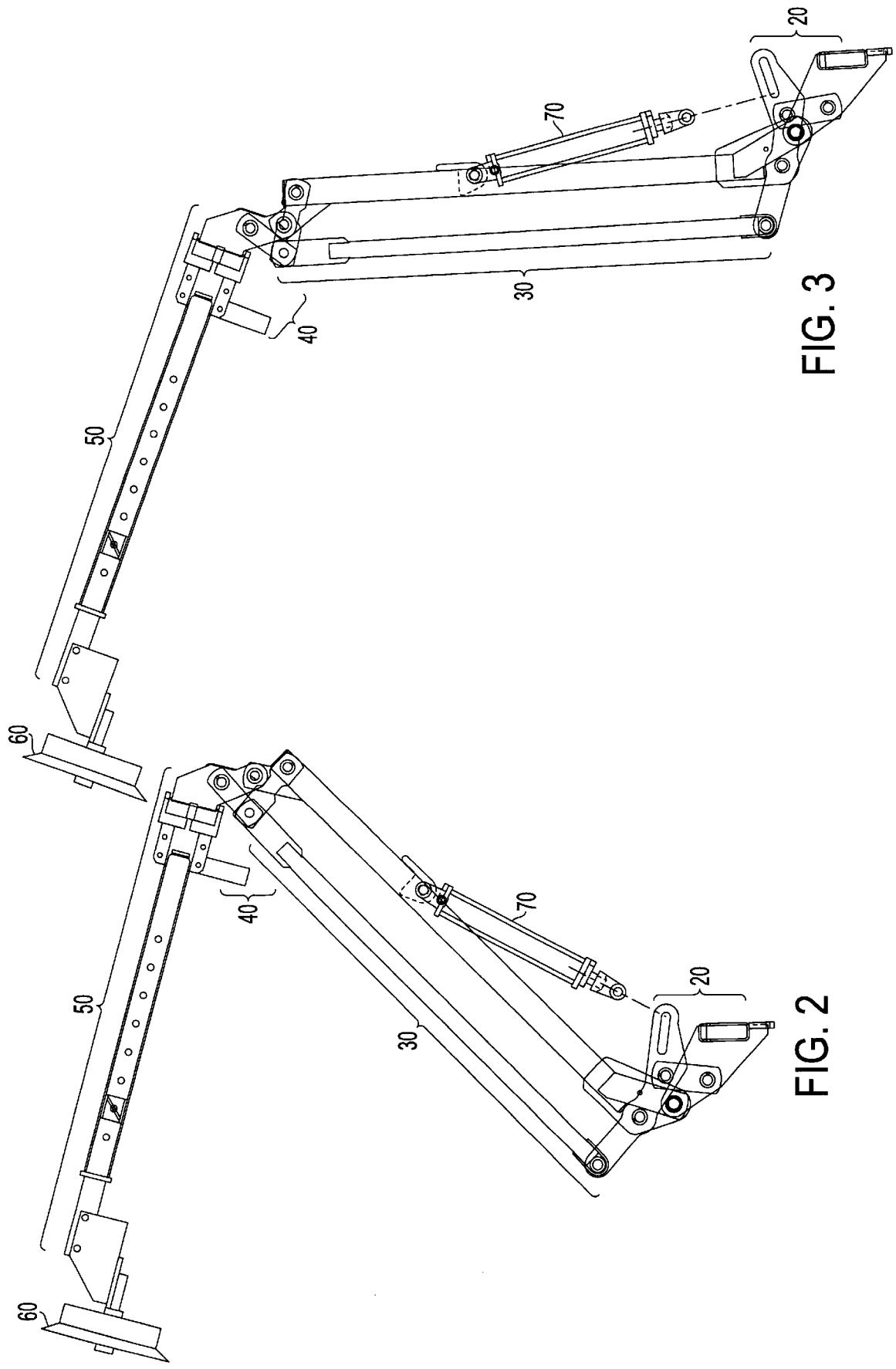

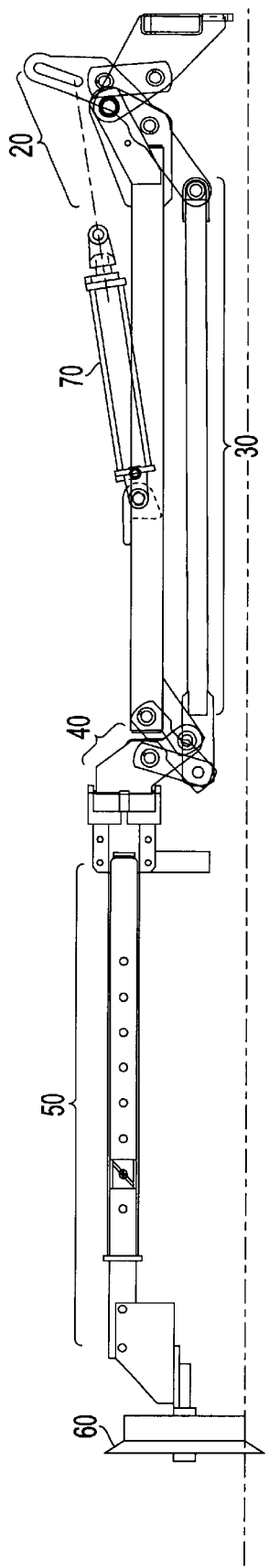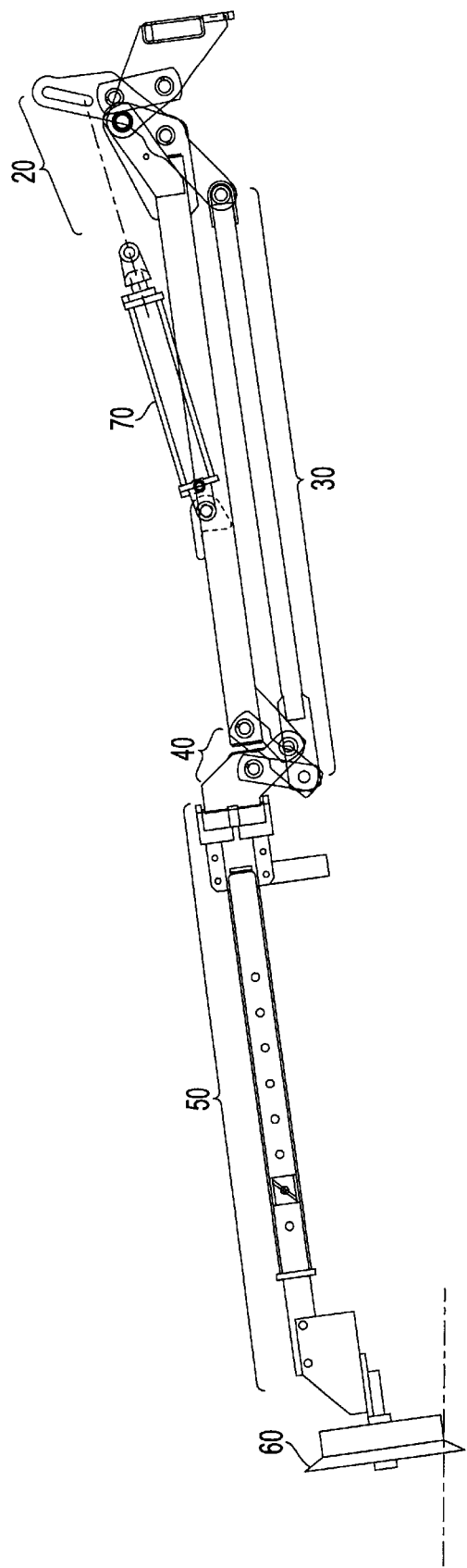
FIG. 6
FIG. 7

COMPACT FOLDING ROW MARKER

FIELD OF THE INVENTION

The present invention relates generally to agricultural implements, and more particularly to a folding row marker having an extended working position and a retracted transport position.

BACKGROUND AND RELATED PRIOR ART

It is generally known to mount a marker to an outside edge of an agricultural implement for forming a marked line in the ground, which is parallel to the direction of the implement's travel. The marked line then serves as references for a subsequent pass of the implement. For example, in a tractor-drawn planter that is planting a number of rows across a field, a marker attached on a structure that extends laterally outward from the side edge of the planter makes a furrow or a mark in the field that is parallel to the direction of the planter's travel and is laterally spaced from the planter. The length of the lateral spacing of the marker is related to the width of the planter so that the marker serves as a guide for alignment of the tractor on the next pass of the planter across the field to allow the planted rows to remain continuous and properly spaced to avoid overlap or other misalignment of the planted rows. Because the tractor-drawn planter can turn either to the left or to the right for the next succeeding pass across the field, markers are generally provided on both sides of the planter implement, and some sort of retraction means, preferably automatic or power-operated, is needed so that the marker on one side of the implement can be lifted or retracted while the marker on the other side is making the mark that guides the next pass.

Retraction is also necessary when transporting the agricultural implement to and from the field. In particular, folding and storing the marker assembly protects the marker from harmful, inadvertent contact with objects in the field. Toward this purpose, it is desirable that the marker assembly folds to store completely within the bounds of the agricultural implement.

With very wide planters that have foldable "wings" or outer sections, the marker must fold into a sufficiently compact form to avoid interfering with either the folding movement of the planter or the companion marker on the opposite side of the planter. This is even more important in the case of very wide implements having doubly articulated outboard sections, where first the outboard sections and then adjacent inboard sections fold up to bring the outboard sections to storage positions inboard and over the main part of the implement. Accordingly, markers intended for use on such implements must fold to a sufficiently compact position as to not interfere with the double folding action.

The folding marker assembly also must be strong enough and properly supported so as to prevent undue strain or tipping force on the outer edge of the planter during use or folding operations. In particular, the folding marker assembly cannot have too much force at the point of attachment at the outside edge of the planter. This is particularly true in the case of very wide agricultural implements that require correspondingly long markers. To address this problem, several known folding marker assemblies use a caster or support wheel partway out on the marker beam, but these elements prevent the marker assemblies from folding compactly. Accordingly, a need presently exists for a folding marker assembly that has a stable, strong structure that can fold into a compact space completely within the bounds of the agricultural implement.

SUMMARY OF THE INVENTION

In response to these and other needs, the present invention provides a folding row marker assembly for use with an agricultural implement. In one embodiment, the folding row marker assembly comprises an inner link assembly with at least one inner link member and a mounting plate adapted to attach to the agricultural implement. The folding row marker assembly further comprises a plurality of parallel inner arm members. Each of the inner arm members has a proximal and a distal end. The proximal end hingedly connects to the inner link assembly, and the distal end hingedly connects to an outer link assembly having at least one outer link member. The folding row marker assembly further comprises at least one outer arm member that has a proximal and a distal end. The proximal end of each outer arm member hingedly connects to the outer link assembly, and the distal end connects to a marker, preferably through a shear bolt. In the folding row marker assembly, a radial motion of the inner arm members around the inner link assembly causes the outer arm member to move in a controlled radial motion around the outer link assembly, relative to the inner arm members. The radial motion of the inner arm members around the inner link assembly is caused by an actuating mechanism, such as a hydraulic cylinder, that connects to an inner link member and to one of the inner arm members. As a result, the row marker assembly moves between a folded storage position and an extended, generally horizontal use position in which the marker engages the ground.

In an alternative three-section embodiment of the folding row marker, the outer link assembly further comprises a plurality of outer link members that combine to form a middle link assembly that connects to the inner arm members, an outboard link assembly that connects to the outer arm members, and a plurality of middle arm members that connect at a proximal end to the middle link assembly and at a distal end to the outboard link assembly.

Accordingly, the present invention offers a folding row marker with a sturdy structure that can fold into a small volume of space on the tillage implement or planter to which it is attached. This aspect enables farm equipment that can be transported at narrower widths and shorter heights, thereby increasing the maneuverability of the equipment and reducing the hazards associated with transport.

BRIEF DESCRIPTION OF THE DRAWINGS

The invention will become more clearly understood from the following detailed description in connection with the accompanying drawings, in which:

FIGS. 1–8 are drawings of a folding marker assembly in different positions, in accordance with a preferred embodiment of the present invention;

DETAILED DESCRIPTION OF THE PREFERRED EMBODIMENTS

Figure 4:
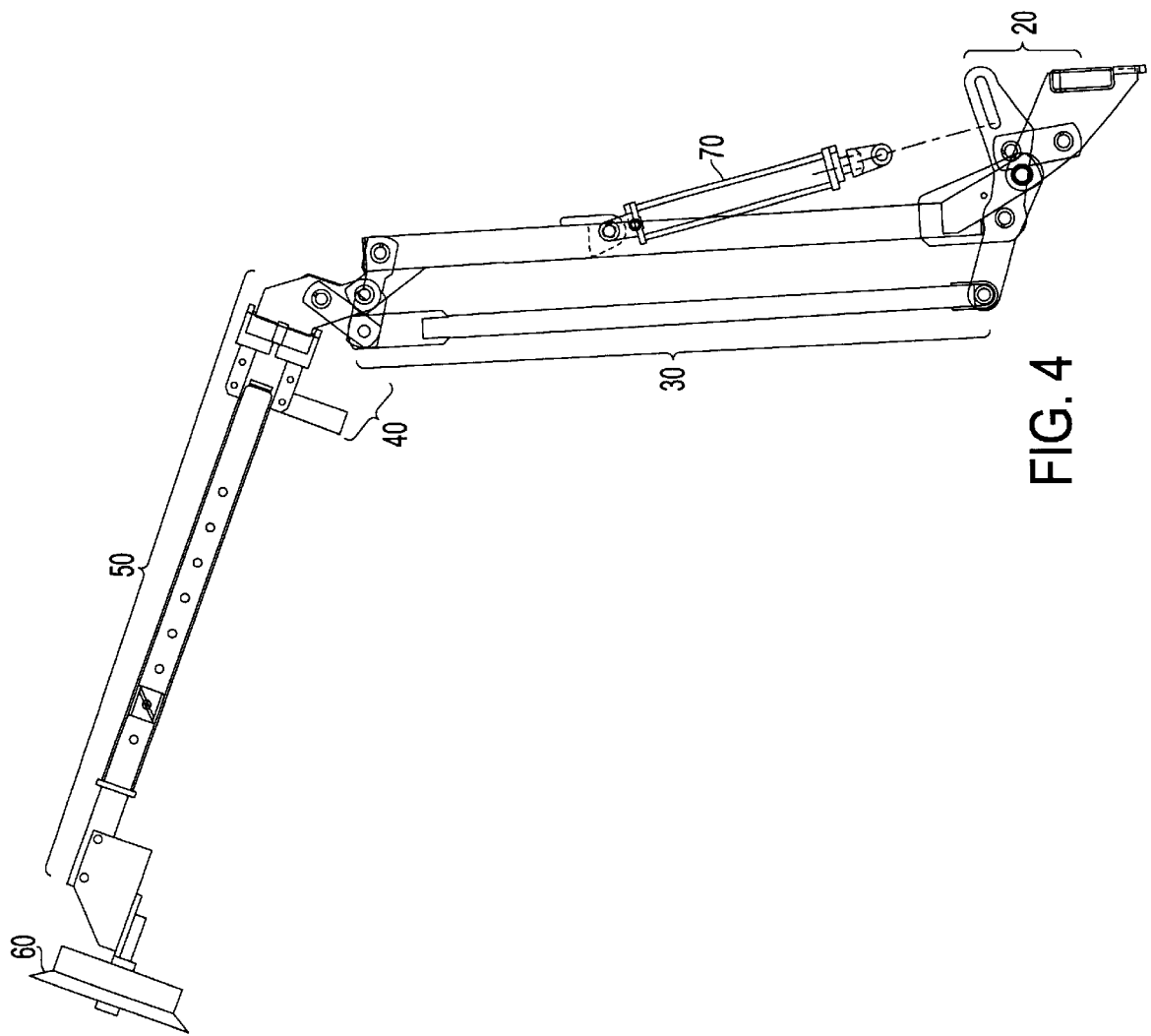

The present invention provides a folding row marker assembly 10 for use with an agricultural implement (not illustrated). FIGS. 1–8 illustrate the folding row marker 10 having two sections. The two-section row marker is generally used for marking a width for eight rows. The folding row marker 10 has an inner arm section 30 and an outer arm section 50 that contains a marker 60. An inner link assembly 20 connects the inner arm section 30 to the agricultural implement, and an outer link assembly 40 connects the inner arm section 30 to the outer arm section 50. The inner arm section 30 contains at least two arm members, respectively 32 and 34. Each of the inner arm members 32 and 34 has a proximal end 31 that hingedly connects to the inner link assembly 20 and a distal end 33 that hingedly connects to the outer link assembly 40. As a result of this structure, the inner arm members 32 and 34 move in a substantially coordinated motion. The outer arm section 50 has at least one outer arm member 52. The outer arm member 52 has a proximal end 54 that hingedly connects the outer link assembly 40 and a distal end 56 that connects to the marker 60, such that the marker 60 is allowed to rotate along the ground to create a mark. As a result of this structure, a radial motion of the inner arm section 30 around the inner link assembly 20 causes the outer arm section 50 to move in a controlled radial motion around the outer link assembly 40, relative to the inner arm section 30. In particular, the folding row marker assembly 10 moves between a folded storage position, as illustrated in FIG. 1 and an extended, generally horizontal use position in which the marker 60 engages the ground, as illustrated in FIG. 7.

Figure 5:
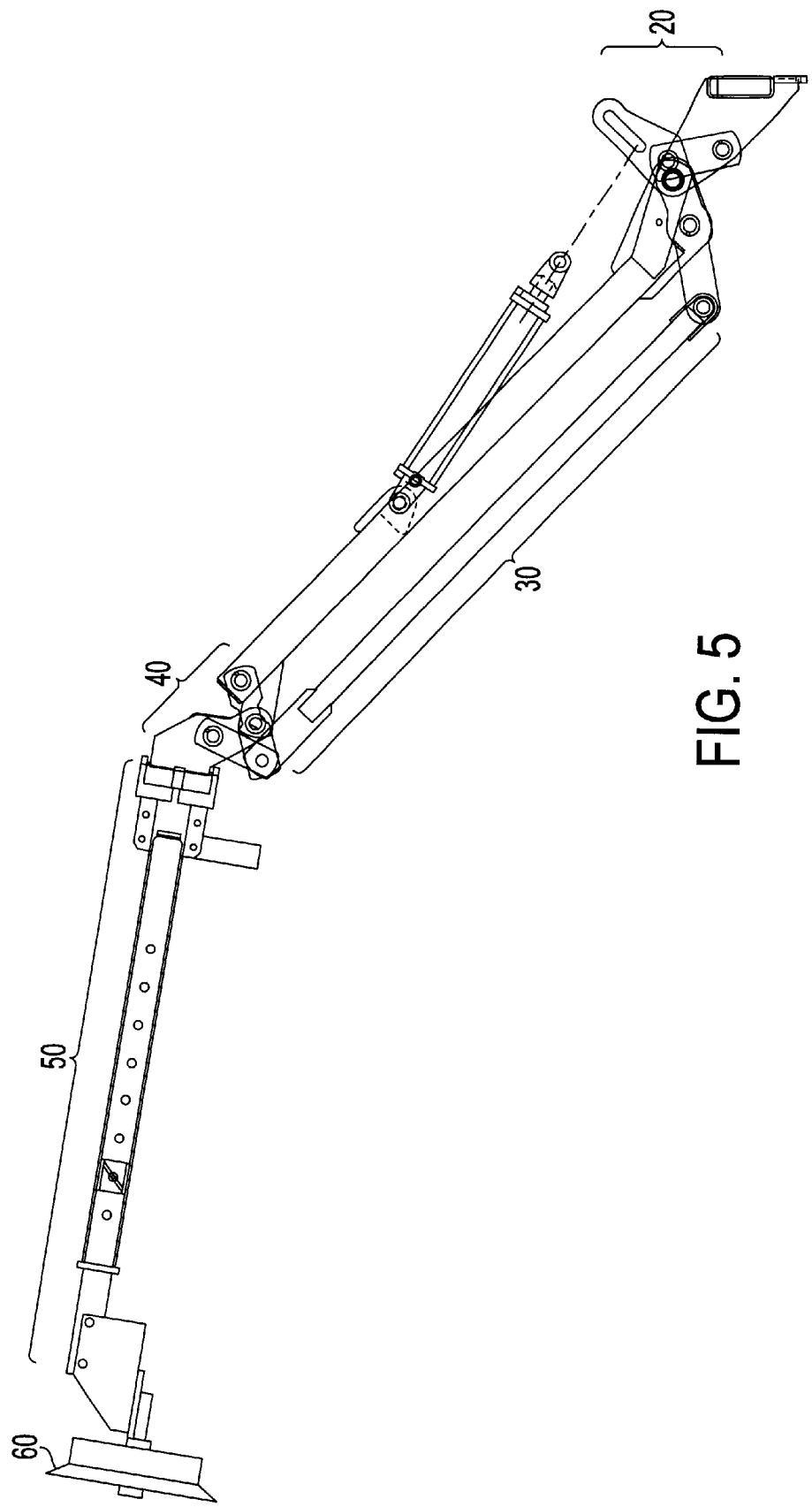
Figure 8:
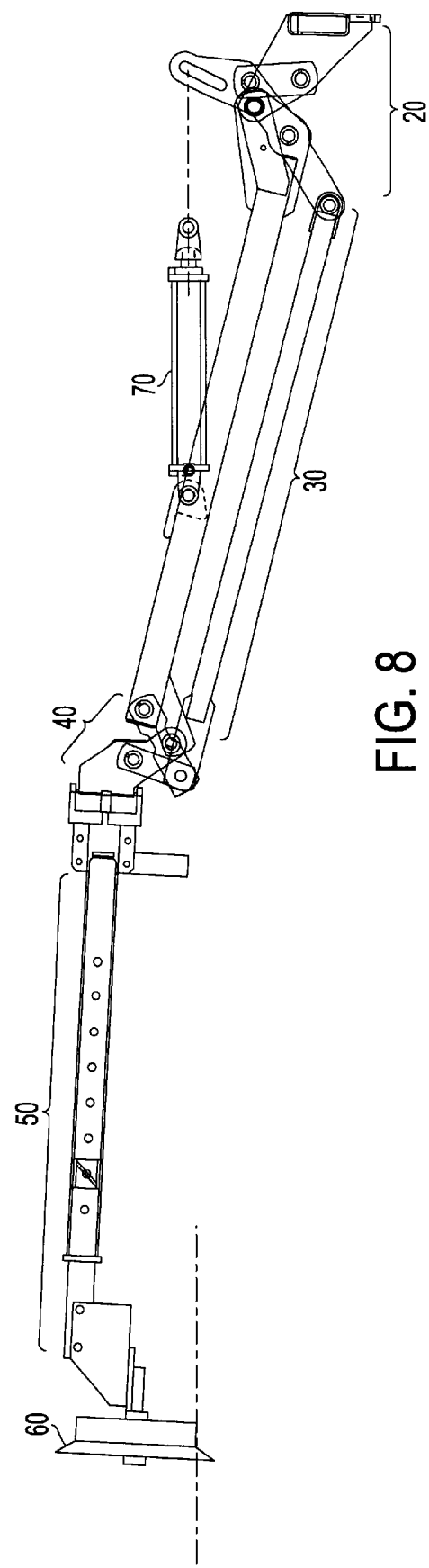

The radial motion of the inner arm section 30 is caused by an actuating mechanism 70 that connects to the inner arm section 30 and to the inner link assembly 20. The actuating mechanism 70 is generally a hydraulic cylinder that operates each marker. Furthermore, the marker assembly can float over ground contours without requiring movement of the actuating mechanism 70. The movement of the actuating mechanism 70 provides a smooth, uniform transition from the storage position to the operational position. In particular, actuating mechanism 70 extends to cause the marker assembly 10 to rise, as illustrated in FIGS. 2–3. At the position illustrated in FIG. 4, the actuating mechanism 70 is perpendicular to the slot in the linkage. This occurs at the point where in the center of gravity of the assembly is directly over the effective center of rotation of the mechanism. Thus, the marker assembly does not suffer from lost motion or free falling during the folding/unfolding cycles. FIGS. 5–7 show the continuation of the unfolding cycle until the marking blade contacts the ground at FIG. 7. FIG. 8 illustrates the free motion available so that the marker blade can traverse uneven terrain.

Figure 9:
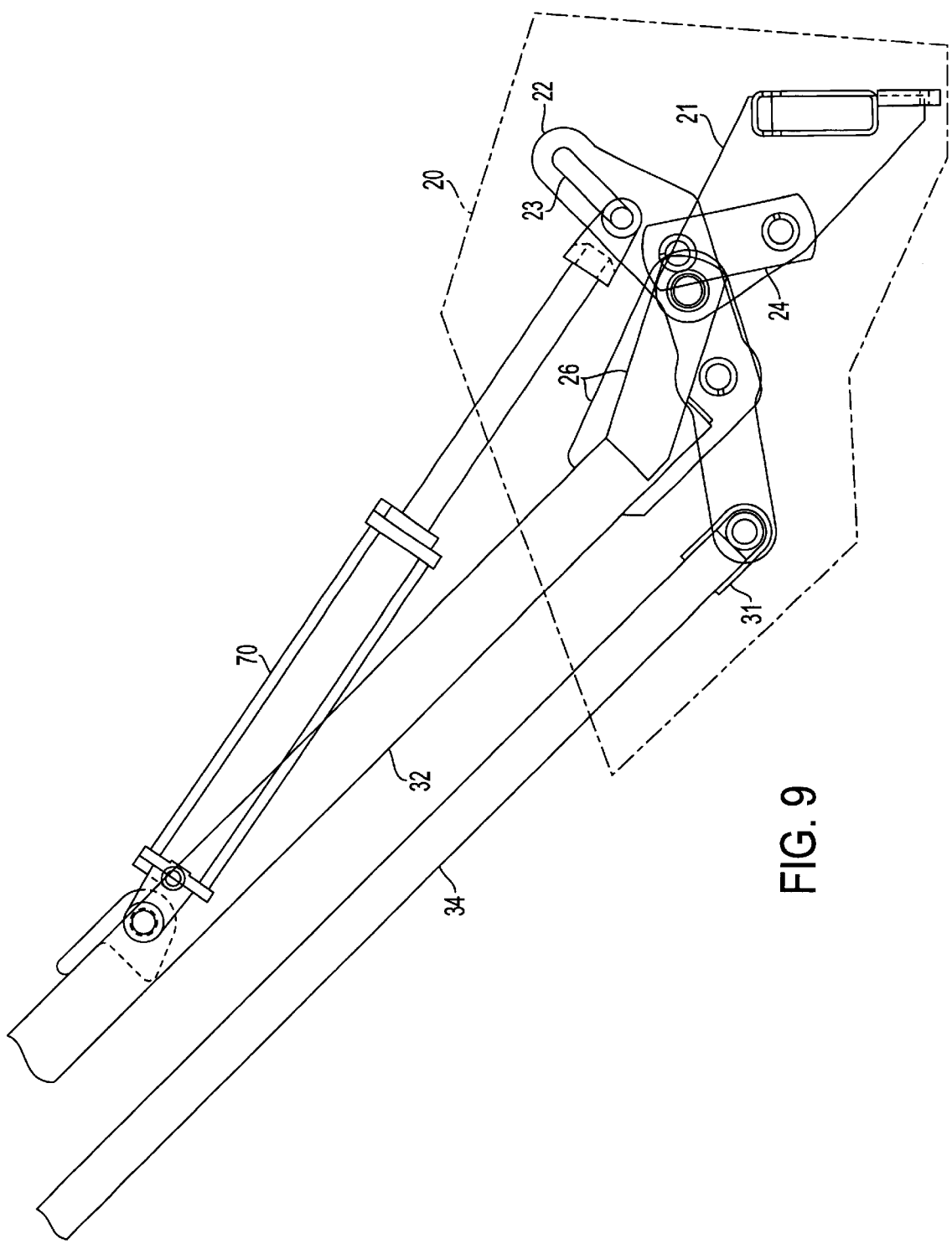
FIG. 9 is a drawing of an enlargement of an inner joint of the folding marker assembly of FIGS. 1–8 and 11–14.

As described above, the inner link assembly 20 connects to the proximal end 31 of the inner arm members 32 and 34. In particular, the inner link assembly 20 in a preferred embodiment of a present invention, as illustrated in FIG. 9, has a first, a second and a third inner link member, respectively 22, 24 and 26, and a mounting plate 21 that attaches to the agricultural implement. Specifically, the mounting plate 21 connects to the third inner link member 26 and the second inner link member 24. Then, the first inner arm member 32 fixedly connects to the third inner link member 26. Furthermore, the first inner link member 22 connects to the third inner link member 26, the second inner arm member 34, and the second inner link member 24. The first inner link member 22 further contains a slot 23 for connection with the actuating member 70. The connections, unless otherwise specified, are preferably hinged to allow rotation of the elements in a plane around the connections.

Figure 10:
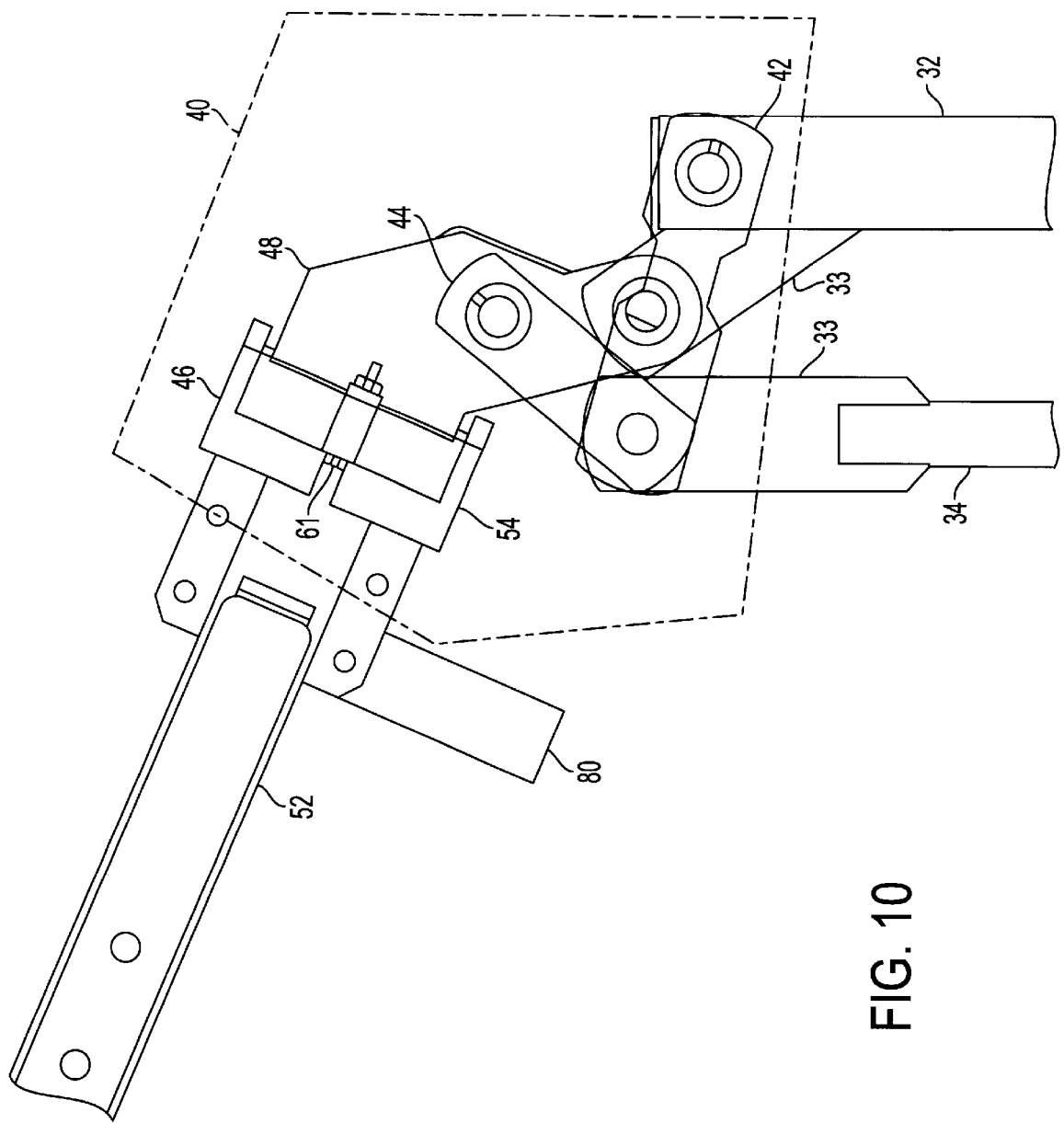
FIG. 10 is a drawing of an enlargement of an outer joint of the folding marker assembly of the FIGS. 1–8.
Figure 11A:
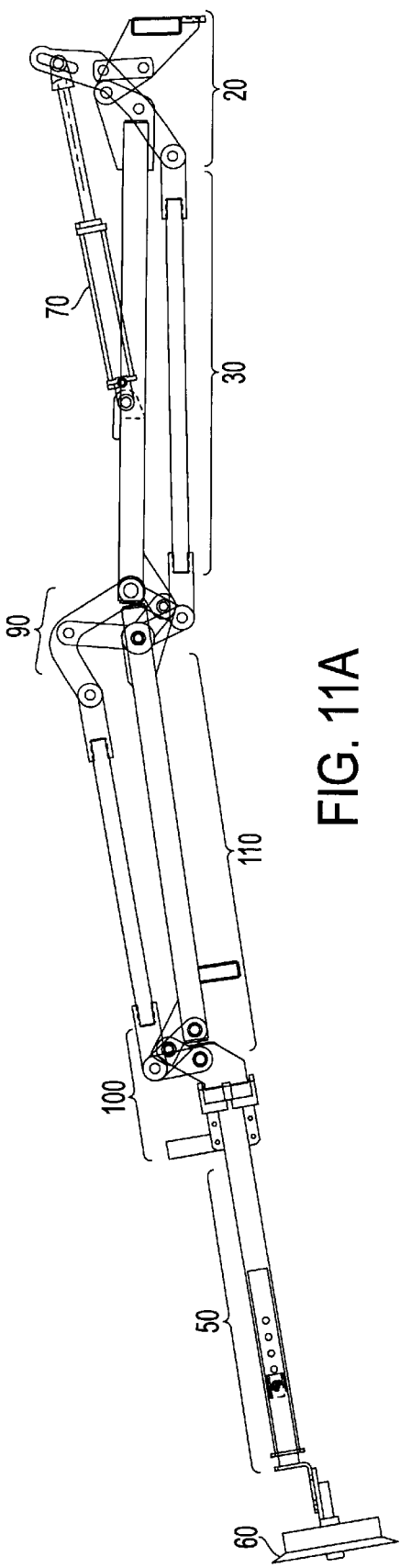
FIGS. 11–14 are drawings of a folding row marker in accordance with an alternative embodiment of the present invention.
Figure 11C:
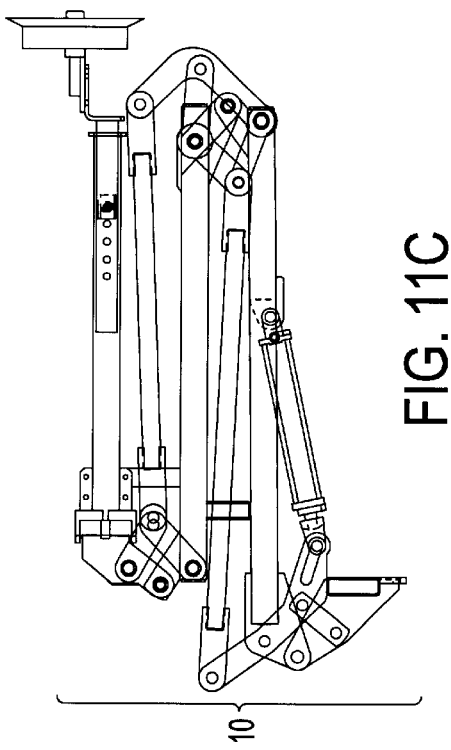
Figure 11B:
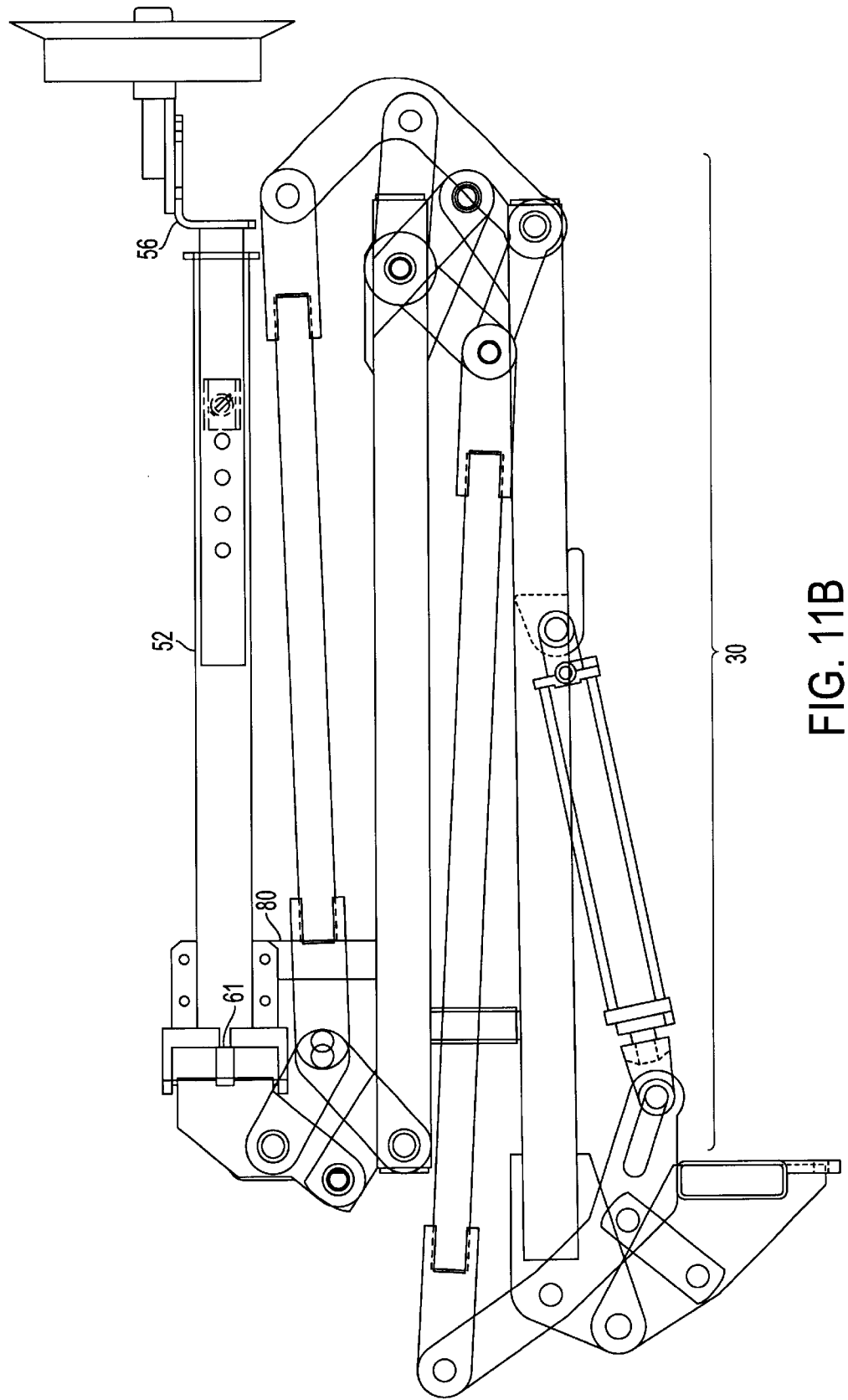
Figure 12:
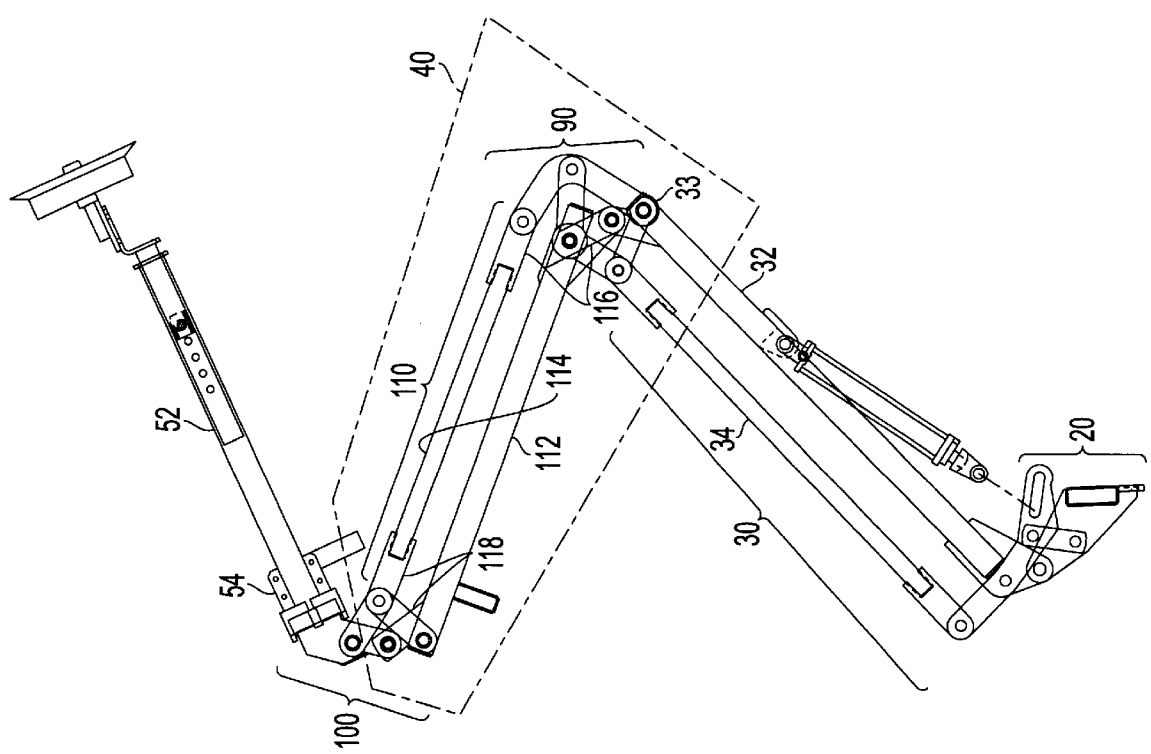
Figure 13:
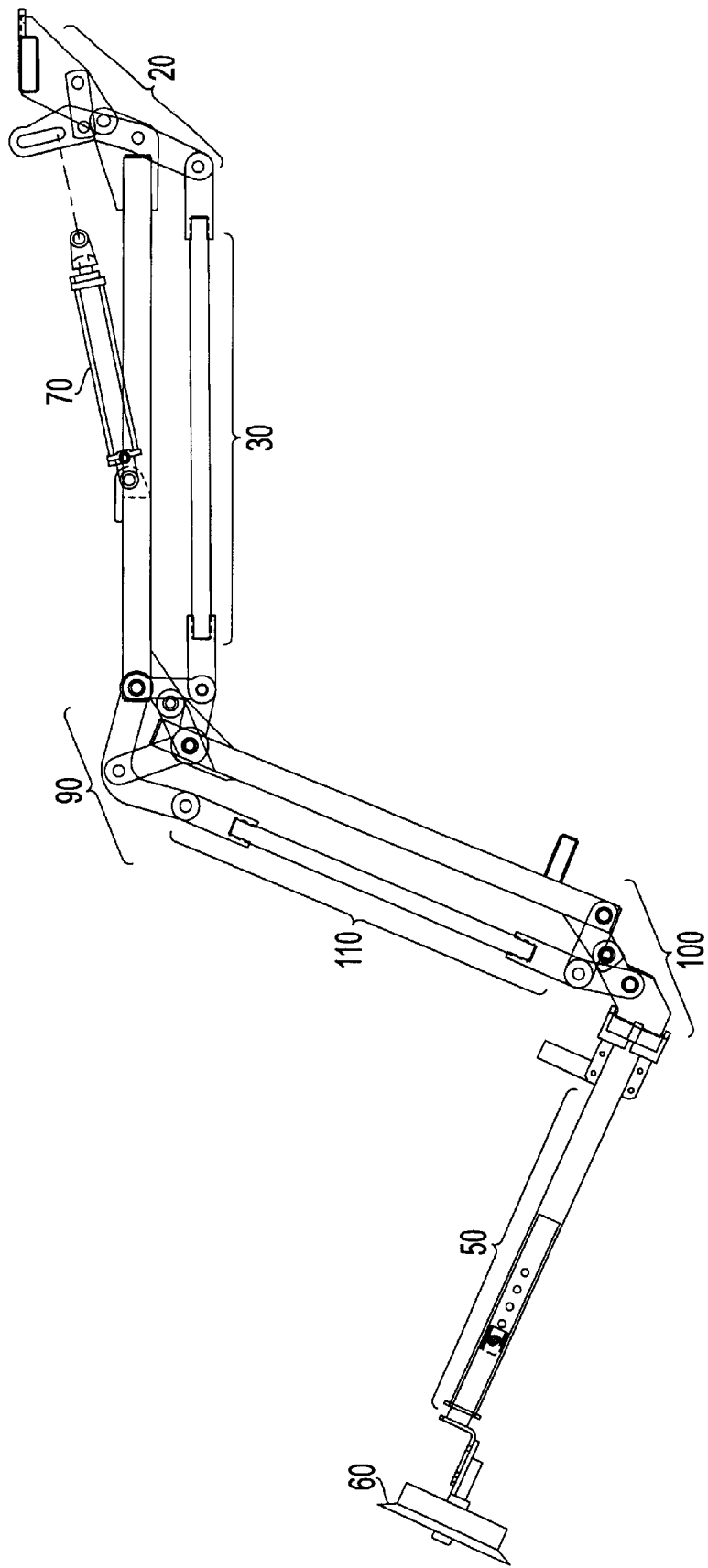
Figure 14:
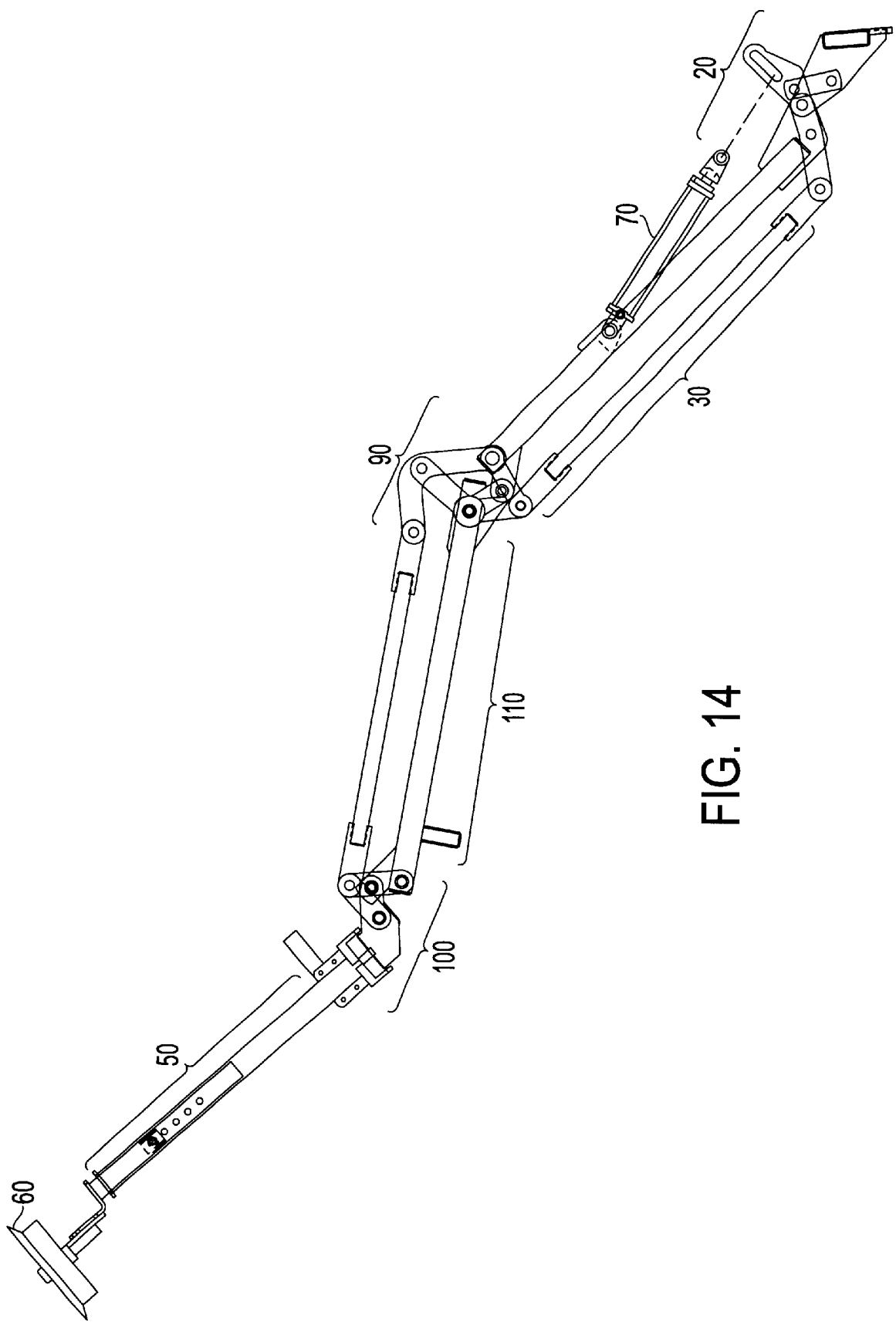

The outer link assembly 40 connects the distal ends 33 of the inner arm members 32 and 34 to the proximal end 54 of the outer arm member 52. As illustrated in FIG. 10, the outer link assembly 40 of a preferred embodiment of the present invention contains a first, a second, a third and a fourth outer link member, respectively 42, 44, 46 and 48. The first outer link member 42 fixedly connects to the distal end 33 of the first inner arm member 32. The first outer link member 42 further connects to the second outer link member 44 and the third outer link member 48. The second outer link member 44 also connects to second inner arm member 34 and the fourth outer link member 48. The third outer link member 46 fixedly connects to the outer arm member 52. To complete the outer link assembly 40, the fourth outer link member 48 connects to the second inner link member 44 and the third outer frame member 46. Again, the connections, unless otherwise specified, are hinged to allow rotation of the elements in a plane around the connection.

In a preferred embodiment, the first arm section 30 (FIG. 1) are two four-bar linkage formed by one of the inner link members, two of the inner arm members, and one of the outer link members at each end. In the illustrated embodiment of FIGS. 1–8, the combination of the first and second inner arm members 32 (as extended by the first outer link member 42) and 34, the first inner link member 22 and the second outer link member 44 forms two four-bar linkages. The two four-bar linkage mechanism controls the geometric relationship between the marking blade and the agricultural implement to which it is mounted. This enables precise control of each section and provides more uniform velocity throughout the operation cycle between the folded storage position and the extended, generally horizontal use position.

In a preferred embodiment, a shear bolt 61 connects the link 48 to the proximal end 54 of the outer arm member 52. The shear bolt 61 protects the folding maker assembly from impacts by reducing the force from the impacts imparted to the folding marker assembly. Thus, the shear bolt 61 helps to prevent structural damage caused by field obstructions.

The folding marker assembly 10 may also optionally contain one or more folding rests 80 that support the structure of the folding marker assembly 10 when fully folded. In one embodiment, as illustrated in FIGS. 1–8, the folding rest 80 connects to the outer arm member 52. The folding rest 80 contacts the inner arm section 32 when fully folded for storage, as illustrated in FIG. 1.

Figure 15:
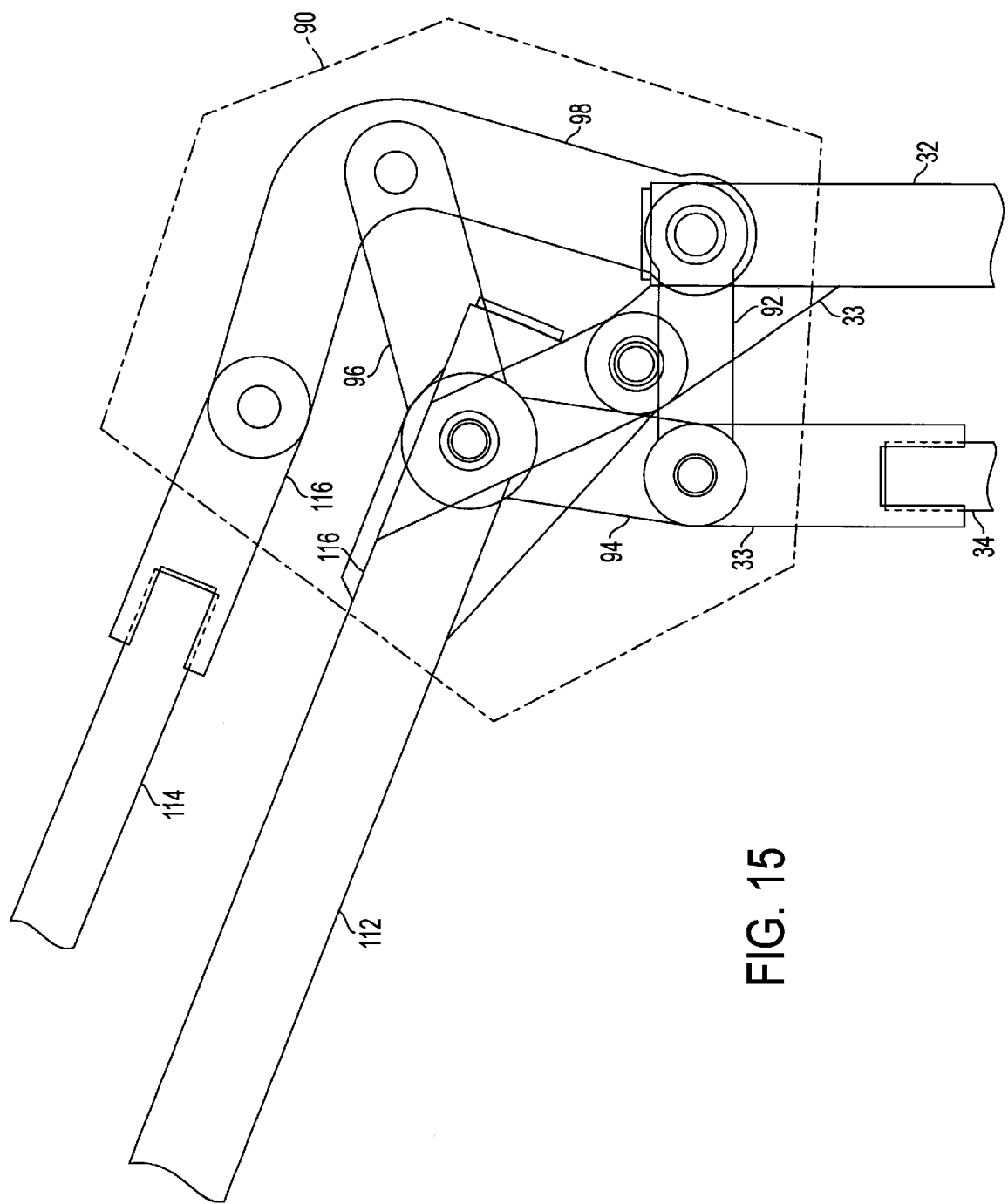
FIG. 15 is a drawing of an enlargement of a middle joint of the alternative folding marker assembly of FIGS. 11–14.

In another preferred embodiment, folding marker assembly 10 has three sections for use on agricultural implements that work twelve rows at once. In this embodiment, illustrated in FIGS. 11–14, the outer link assembly 40 has a plurality of outer link members that combine to form (1) a middle link assembly 90 that hingedly connects to the distal end 33 of inner leg members 32 and 34, (2) an outboard link assembly 100 that hingedly connects to the proximal end 54 of the outer leg member 52, and (3) a middle arm section 110 having a plurality of middle arm members 112 and 114, where each middle arm member has a proximal end 116 that hingedly connects to the middle link assembly 90 and a distal end 118 that hingedly connects to the outboard link assembly 100. As described above, the middle link assembly 90 connects the inner arm section 30 to the middle arm section 110. FIG. 15 illustrates the middle assembly 90 in a preferred embodiment in which the middle link assembly 90 has a first, a second, a third and a fourth middle link member, respectively 92, 94, 96 and 98. The first middle link member 92 fixedly connects to the first inner leg 32 at the distal end 33 and further connects to the second middle member 94 and the fourth middle link member 98. The second middle link member 94 connects to the second inner leg 32 at the distal end 33 and the second middle leg 112 at the proximal end 116. The third middle link member 96 also connects to the first inner leg 32 at the end 33 and further connects to the second middle leg 114 at the proximal end 116 and to the fourth middle link member 98. To complete the middle link assembly 90, the fourth middle link member 98 fixedly connects the first middle leg 114 at proximal end 116. As before, all connections, unless otherwise noted, are hinged to allow radial motion in a plane around the connections.

Figure 16:
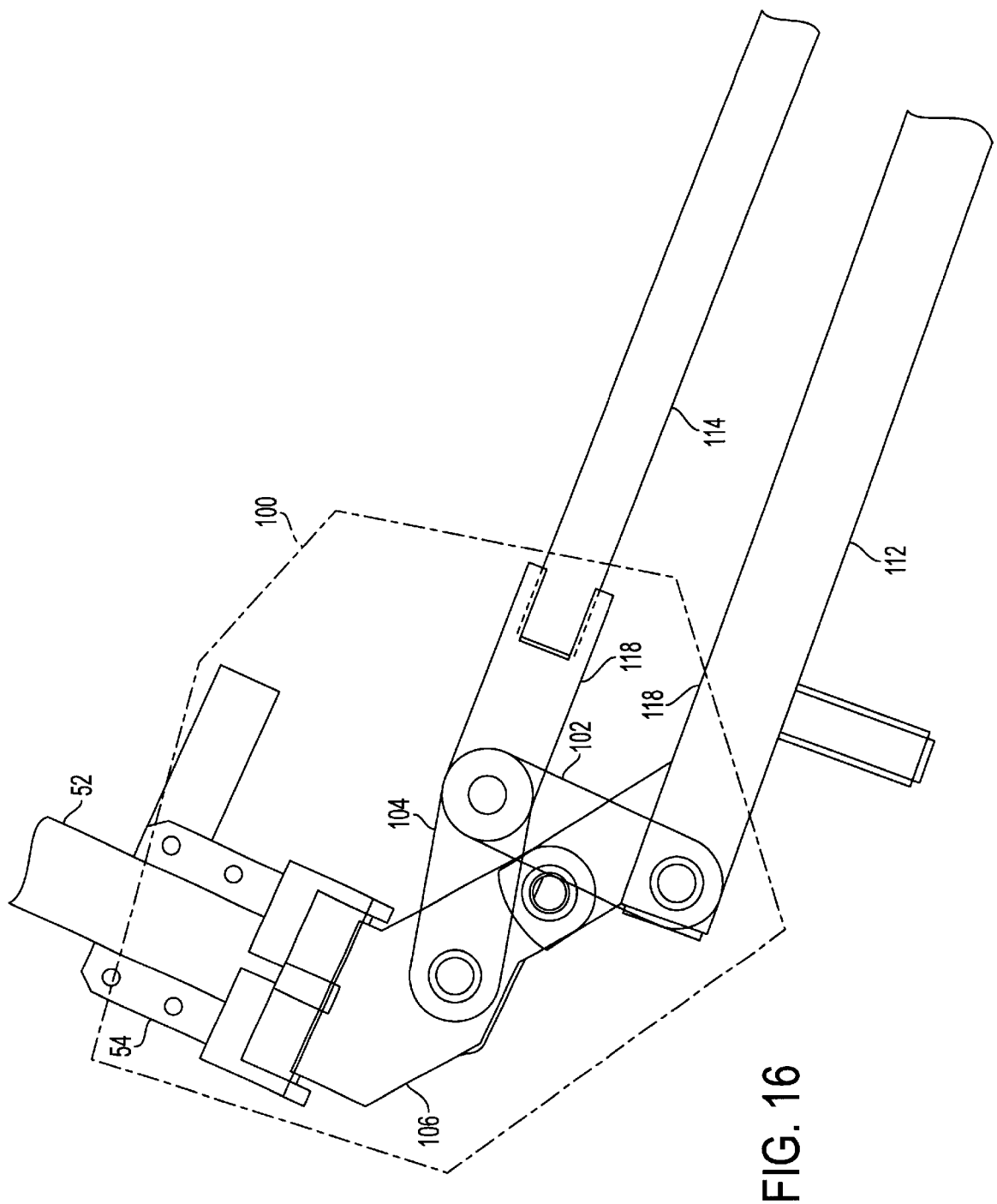
FIG. 16 is a drawing of an outer joint of the alternative folding marker assembly of the FIGS. 11–14.

The outboard link assembly 100 connects the distal end 118 of the middle arm members 112 and 114 to the proximal end 54 of the outer arm member 52. As illustrated in FIG. 16, the outboard link assembly 100 of a preferred embodiment of the present invention contains a first, a second, and a third outboard link member, respectively 102, 104, and 106. The first outboard link member 102 fixedly attaches to the distal end 118 of the first middle arm member 112. The first outboard link member 102 further connects to the second outboard link member 104 and to the third outboard link member 106. In turn, the second outboard link member 104 connects to the distal end 118 of the first middle arm member 114 and to the third outboard link member 106. The third outboard link member 106 completes the outboard link assembly 100 by connecting to the distal end 118 of the second middle arm member 112 and fixedly connecting to the proximal end 54 of the outer arm member 52. All connections, unless otherwise noted, are hinged to allow radial motion in a plane around the connections.

As illustrated in FIGS. 11–14, the inner arm section 30 may be a four-bar linkage formed by the combination of the first inner link member 22, the two inner arm members 32 and 34, and the second middle link member 94. Similarly, the middle arm section 110 may be four-bar linkage formed by the combination of a middle link member such as the third middle link member 96, two middle arm members such as 112 and 114, and one of the outboard link members such as the second outboard link member 104.

Additionally, the three section embodiment of the folding row marker 10 may have a compound four-bar linkage around the middle link assembly 90. This arrangement achieves desired motion for smooth operation and correct positioning of the marker. The compound, four-bar linkage structure is formed by the using the two above-described four-bar linkages for the inner arm section 20 and the middle arm section 110, along with a four-bar linkage in the middle link assembly 90 formed by the combination of the middle link members 92, 94, 96 and 98, as illustrated in FIG. 15.

As presented, the present invention overcomes many of the problems associated with multi-section markers. The folding marker assembly 10 avoids the high angular velocities and high acceleration of known folding marker mechanisms that cause excessive structural stress and that can be hazardous. Additionally, the folding marker assembly 10 folds down compactly over the implement frame when not in use to protect the marker assembly from damage caused by obstructions along the edge of the fields, such as trees, fences, etc. The folding marker assembly 10 is secured in place by the last portion of the retraction of the hydraulic cylinder.

The invention having been described, it will be apparent to those skilled in the art that the same may be varied in many ways without departing from the spirit and scope of the invention. Any and all such modifications are intended to be included within the scope of the following claims.

What is claimed:

1. A folding row marker assembly for use with an agricultural implement, the assembly comprising:

an inner link assembly comprising at least one inner link member and a mounting adapted to attach to the agricultural implement;

a plurality of inner arm members, each inner arm member comprising a proximal end hingedly connected to said inner link assembly and a distal end hingedly connected to an outer link assembly, said outer link assembly comprising at least one outer link member, wherein said inner arm members move in a substantially coordinated motion;

at least one outer arm member, each outer arm member comprising a proximal end hingedly connected to the outer link assembly and a distal end connected to a marker, wherein a radial motion of said inner arm members around said inner link assembly causes said outer arm member to move in a controlled radial motion around said outer link assembly relative to said inner arm members; and an actuating mechanism connected to one of said inner link members and one of said inner arm members, wherein said actuating mechanism causes the radial motion of said plurality of inner arm members around said inner link assembly such that the folding row marker assembly moves between a folded storage position and an extended, generally horizontal use position in which said marker engages the ground.

2. The folding row marker assembly of claim 1, further comprising a four-bar linkage formed by one of said at least one inner link member, two of said plurality of inner arm members, and one of said at least one outer link member.

3. The folding row marker assembly of claim 1, wherein said actuating mechanism is a hydraulic cylinder.

4. The folding row marker assembly of claim 1 further comprising a shear bolt that connects the proximal end of at least one of said outer arm members to at least one outer link member.

5. The folding row marker assembly of claim 1 wherein the outer link assembly further comprises a plurality of said outer link members that combine to form:

a middle link assembly comprising at least one middle link member that hingedly connects to said distal end of said plurality inner leg members;

an outboard link assembly comprising at least one outboard link member that hingedly connects to said proximal end of said at least outer leg member; and a plurality of middle arm members, each middle arm member comprising a proximal end that hingedly connects to said middle link assembly and a distal end that hingedly connects to said outboard link assembly.

6. The folding row marker assembly of claim 5, further comprising:

a first four-bar linkage formed by one of said inner link members, two of said inner arm members, and one of said middle link members; and a second four-bar linkage formed by one of said middle link members, two of said middle arm members, and one of said outboard link assembly members.

7. The folding row marker assembly of claim 6, wherein said middle link assembly comprises a plurality of said middle link members that combine to form at least one four-bar linkage.

8. The folding row marker of claim 5, wherein said middle arm members further comprise first and second middle arm members; and wherein said middle link assembly further comprises a first middle link member that connects to said first inner leg, to a second middle link member, and to a fourth middle link member; said second middle link member further connected to said second inner leg and to said second middle leg; said fourth middle link member further connected to said first middle leg and to a third middle link member; said third middle link member further connected to said first inner leg and to second middle leg.

9. The folding row marker of claim 8, wherein said outboard link assembly contains a first outboard link member connected to said second middle arm member and to a second outboard link member; said second outboard link member further connected to said first middle arm member and to a third outboard link member; said third outboard link member further connected to said second middle arm member and to said outer arm member.

10. The folding row marker assembly of claim 1,
wherein said inner arm members further comprise first and second inner arm members; and
wherein said inner link assembly further comprises a first inner link member that connects to a second inner link member, to a third inner link member, to said second inner arm member, and to said actuating mechanism; said second inner link member further connected to said mounting; and said third inner link member further connected to said mounting and said first inner arm member.

11. The folding row marker assembly of claim 10, wherein said outer link assembly further comprises a first outer link member that connects to said first inner arm member, to a second outer link member, and to a third outer link member; said second outer link further connected to said second inner arm member and to a fourth outer link member; and said third outer link member further connected to said outer arm member and to said fourth outer link member.

* * * * *